United States Patent [19]

Sourdet

[11] Patent Number: 4,735,841
[45] Date of Patent: Apr. 5, 1988

[54] FIRE-RESISTANT COWLS, PARTICULARLY FOR AIRCRAFT ENGINES

[75] Inventor: Claude Sourdet, Bayonne, France

[73] Assignee: Avions Marcel Dassault-Breguet Aviation, Vaucresson, France

[21] Appl. No.: 903,429
[22] PCT Filed: Jan. 8, 1986
[86] PCT No.: PCT/FR86/00003
 § 371 Date: Sep. 2, 1986
 § 102(e) Date: Sep. 2, 1986
[87] PCT Pub. No.: WO86/04018
 PCT Pub. Date: Jul. 17, 1986

[30] Foreign Application Priority Data

Jan. 9, 1985 [FR] France ............... 85 00224

[51] Int. Cl.⁴ .............................................. B32B 3/12
[52] U.S. Cl. .................................. 428/116; 156/292; 428/408
[58] Field of Search ............ 428/116, 117, 118, 73, 428/408; 156/292

[56] References Cited

U.S. PATENT DOCUMENTS

| | | | |
|---|---|---|---|
| 2,477,852 | 8/1949 | Bacon | 428/116 |
| 3,475,262 | 10/1969 | Sargent et al. | 428/117 |
| 3,502,171 | 3/1970 | Cowan | 428/116 X |
| 3,703,422 | 11/1972 | Yoshino | 428/116 X |
| 3,713,959 | 1/1973 | Rottmayer et al. | 428/116 X |
| 3,914,494 | 10/1975 | Park | 428/116 X |
| 4,014,147 | 3/1977 | Wesch | 428/116 X |
| 4,016,022 | 4/1977 | Browning et al. | 428/116 X |
| 4,063,847 | 12/1977 | Simmons | 415/200 |
| 4,063,981 | 12/1977 | Rhodes et al. | 428/116 X |
| 4,091,160 | 5/1978 | Koss | 428/116 X |
| 4,390,584 | 6/1983 | Briens | 428/116 |
| 4,421,827 | 12/1983 | Phillips | 428/418 |
| 4,557,961 | 12/1985 | Gorges | 428/117 |
| 4,569,884 | 2/1986 | Weinand et al. | 428/245 |
| 4,599,255 | 7/1986 | Anglin et al. | 428/73 |
| 4,671,841 | 6/1987 | Stephens | 428/116 X |

FOREIGN PATENT DOCUMENTS 2338137 8/1977 France .
2092950 8/1982 United Kingdom ........... 428/116

Primary Examiner—Henry F. Epstein
Attorney, Agent, or Firm—Watson, Cole, Grindle & Watson

[57] ABSTRACT

A panel structure useful in constructing cowlings for aircraft engines includes a honeycomb core composed of glass fibers impregnated with phenol resin, an inner covering attached to an inner surface of the honeycomb core which is made of carbon fibers impregnated with phenol resin and which is porous, and an outer covering attached to an outer surface of the honeycomb core which is made of carbon fibers impregnated with phenol resin and which is leaktight. The outer covering is formed by heating the carbon fibers and phenol resin to cause polymerization while subjecting the outer covering first to vacuum and then to high pressure.

10 Claims, 1 Drawing Sheet

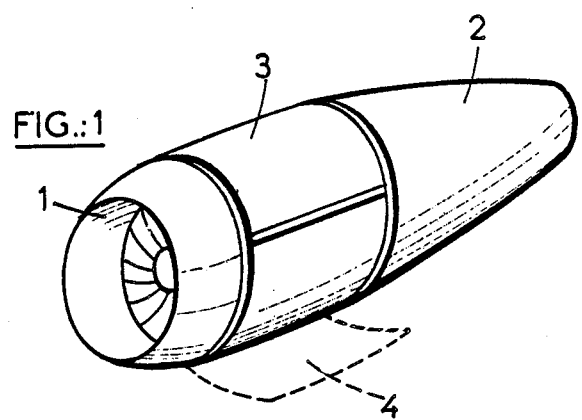
FIG.:1
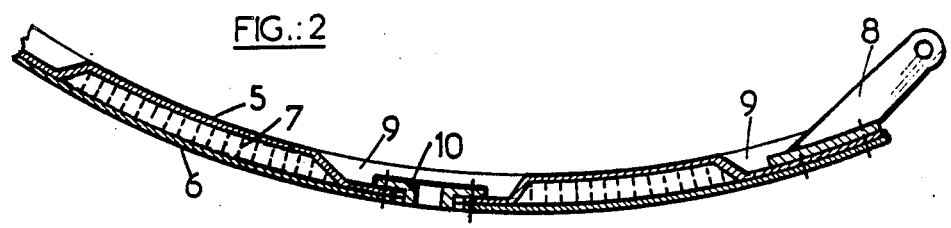
FIG.:2

FIRE-RESISTANT COWLS, PARTICULARLY FOR AIRCRAFT ENGINES

BACKGROUND OF THE INVENTION

The invention relates to panels for nacelles intended to house aircraft engines, and more particularly transport aircraft engines, and which have detachable parts constituting what is generally called the cowling.

The cowling of an aircraft engine must be constructed in such a manner as to ensure the continuity of shape of the nacelle, to withstand aerodynamic forces, to be insensitive to the various fluids originating from the engine, and, in the case of an engine fire, to contain the fire before the extinguishers are operated. With regard to this last point, the standard FAR 25 stipulates resistance of the cowling to a flame at a temperature of 1100° C. for 15 minutes.

Up to the present time this requirement could be met only by metals which withstand high temperatures, such as stainless steels or titanium, whereas light alloys or composite materials containing an epoxy resin were suitable only with the addition of protectors of refractory materials or intumescent paints, the end result being that the cowlings were heavy and costly.

SUMMARY OF THE INVENTION

The present invention makes it possible to produce cowlings of composite material which have no protection and are therefore lighter and less expensive, and which have satisfactory resistance to fire.

According to a first characteristic of the invention the sandwich panels constituting the cowlings are composed of coverings of carbon fibres impregnated with phenol resin and joined together by a honeycomb core which may be of glass fibres, likewise impregnated with phenol resin.

It has in fact been found that in order to form the outer and inner coverings of a panel which has to satisfy the conditions defined above it was advantageous to use carbon fibres which have higher resistance to temperature than glass fibres or fibres of the material known as "KEVLAR" and higher mechanical resistance than refractory fibres, such as silica for example.

The carbon fibres are preferably used in the form of woven fabrics to constitute the coverings, as woven fabrics make it possible to obtain coverings whose resistance in the event of fire is better than that of nonwoven fibres, which are torn away.

The phenol resin used to impregnate such woven fabrics may be the resin available on the market under the trade mark "Brochier 200", which is almost completely insensitive to fire.

For the purpose of joining the coverings and the interposed honeycomb, it is advantageous to use an epoxy adhesive, which will be deposited in the form of a film on the coatings before they are joined to the honeycombs.

According to another feature of the invention the outer coating and the inner coating are treated separately in such a manner that the outer coating will be as fluidtight as possible, but that the inner coating will be porous.

The phenol resin used for impregnating the carbon fabric constituting the base of each of the coatings gives off gases during its polymerization under heat.

This being so, the outer coating will be baked in an autoclave, first in vacuo in order to eliminate as much as possible the gases given off, and then in the final phase of the baking it will be subjected to heavy pressure in order to close the pores, so that the residual gas will remain in the coating in the form of fine included bubbles.

For the inner coating the polymerization will also be effected by baking in an autoclave, but without the application of a vacuum, and in such a manner that most of the pores remain open. This porosity of the inner coating prevents it from bursting through the action of the abrupt rise in temperature caused by the fire.

It is advantageous to complete the production of the inner covering by adding a coating of low melting metal sprayed onto the inwardly facing surface of this covering, and also a coating of cellulose paint in order that this covering may be fluidtight under normal operating conditions, but will become porous again in the event of fire, through the disappearance of the paint and the immediate melting of the metal coat.

A suitable metal that may be mentioned is tin, which melts at 230° C.

The coat of metal sprayed on also makes it possible to protect the cowling and the instruments connected to the engine against the effects of lightning. It is connected electrically to earth by the fastening fittings.

The invention will be better understood by reference to the accompanying drawings, taken with the following discussion.

DESCRIPTION OF THE DRAWINGS

FIG. 1 of the accompanying drawings, given by way of example, shows schematically in perspective an engine nacelle with its cowling.

FIG. 2 shows on a large scale a partial cross-section of the cowling.

DETAILED DESCRIPTION OF THE DRAWINGS

In FIG. 1 can be seen a fusiform nacelle with its air inlet opening 1 for feeding the engine contained in it, and with its rear portion 2 enclosing the gas ejection nozzle. 3 designates the cowling which covers the engine and which is detachable in order to permit inspection of the components of the engine. This cowling, which has a generally cylindrical shape, comprises in the usual way parts articulated together, one of which (4) is shown in dotted lines in the open position.

In FIG. 2 can be seen a cross-section of a part of the cowling comprising the inner covering 5 and the outer covering 6, which are joined together by a honeycomb 7.

Two or three panels of this kind, in the form of parts of a cylinder whose generatrices are perpendicular to the plane of FIG. 2, are joined together to form the complete cylinder surrounding the engine, the joining being effected by metal fittings such as 8. The elements are provided with pockets or cavities, such as 9, in which the honeycomb is removed and the two coatings bonded to one another form only a single thickness. In these pockets are fixed the fastening fittings 8, articulations, apertured members 10 for the admission and discharge of air to and from the cowlings, and so on.

It is obvious that the embodiments described are only examples and that they could be modified, particularly by substituting technical equivalents, without thereby departing from the scope of the invention.

What is claimed is:

1. A method for the production of panels, particularly engine cowlings, comprising the following steps:
   (a) preparing a honeycomb core having cells which are substantially void and which are defined by walls of glass fibers impregnated with phenol resin,
   (b) preparing apart a fluid-tight outer covering of carbon fibers impregnated with phenol resin, this step comprising a polymerization of the outer covering which is first effected in a vacuum in order to evacuate the gases and in the final phase is effected with the application of heavy pressure in order to close the pores and to achieve the best possible fluid tightness,
   (c) preparing apart a porous inner covering of carbon fibers impregnated with phenol resin, this step comprising a polymerization of the inner covering which is effected in an autoclave without application of a vacuum, and in such a manner that most of the pores remain open, and
   (d) joining said coverings to said honeycomb core, the cells of said honeycomb core remaining substantially void.

2. A method according to claim 1, further comprising a step (e) which consists in coating said inner covering with low melting metal.

3. A method according to claim 1, wherein said coverings and said honeycomb core are joined by means of an epoxy adhesive.

4. A panel comprising a honeycomb core consisting substantially of void cells limited by walls and having an outer covering and an inner covering joined to said honeycomb core and consisting of carbon fibers impregnated with phenol resin, wherein said walls of said honeycomb core are made of glass fibers impregnated with phenol resin, said outer covering is leaktight and said inner covering is porous with open pores.

5. A panel according to claim 4, wherein said inner covering has a leak-tight coating which is capable of disappearing to make said inner covering again permeable by heating.

6. A panel according to claim 5, wherein said coating is of a low melting metal.

7. A panel according to claim 6, wherein said low melting metal is tin.

8. A panel according to claim 4, wherein said inner and outer coverings are joined to said honeycomb core by an epoxy adhesive.

9. An engine cowling consisting essentially of an assembly of panels according to claim 4.

10. A method of producing panels which can be used in constructing engine cowlings, said method comprising the steps of
   (a) preparing a honeycomb core which is made of glass fibers impregnated with a phenol resin, said honeycomb core defining an outer surface and an inner surface and containing a plurality of empty cells therein,
   (b) providing a first fabric made of carbon fibers, said first fabric defining a plurality of pores therein,
   (c) treating said first fabric with a phenol resin to provide an impregnated first fabric,
   (d) heating said impregnated first fabric to a polymerizing temperature while simultaneously subjecting said impregnated first fabric to a vacuum to remove gases from the pores therein and then subjecting said impregnated first fabric to high pressure to close said pores and lock residual gases therein, thereby providing a fluid-tight first outer covering.
   (e) providing a second fabric made of carbon fibers, said second fabric defining a plurality of pores therein,
   (f) treating said second fabric with a phenol resin to provide an impregnated second fabric,
   (g) heating said impregnated second fabric to a polymerization temperature but without simultaneously applying vacuum, thereby providing a porous second outer covering whose pores remain mostly open, and
   (h) respectively attaching said inner and outer coverings to the inner and outer surfaces of said honeycomb core, thereby providing said panels.

* * * * *